United States Patent
Zhang et al.

(10) Patent No.: US 11,417,204 B2
(45) Date of Patent: Aug. 16, 2022

(54) VEHICLE IDENTIFICATION METHOD AND SYSTEM

(71) Applicant: Harman International Industries, Incorporated, Stamford, CT (US)

(72) Inventors: Guoxia Zhang, Shanghai (CN); Qingshan Zhang, Shanghai (CN)

(73) Assignee: Harman International Industries, Incorporated, Stamford, CT (US)

( * ) Notice: Subject to any disclaimer, the term of this patent is extended or adjusted under 35 U.S.C. 154(b) by 530 days.

(21) Appl. No.: 16/316,307

(22) PCT Filed: Jul. 15, 2016

(86) PCT No.: PCT/CN2016/090197
§ 371 (c)(1),
(2) Date: Jan. 8, 2019

(87) PCT Pub. No.: WO2018/010172
PCT Pub. Date: Jan. 18, 2018

(65) Prior Publication Data
US 2021/0241611 A1 Aug. 5, 2021

(51) Int. Cl.
*G08G 1/017* (2006.01)
*H04W 4/46* (2018.01)
(Continued)

(52) U.S. Cl.
CPC .......... *G08G 1/017* (2013.01); *G06K 9/6215* (2013.01); *G08G 1/0108* (2013.01); *G08G 1/04* (2013.01); *H04W 4/46* (2018.02)

(58) Field of Classification Search
None
See application file for complete search history.

(56) References Cited

U.S. PATENT DOCUMENTS

| 2012/0329433 | A1 | 12/2012 | Fogarty |
| 2013/0030687 | A1* | 1/2013 | Shida ............. G01S 5/0072 701/301 |

(Continued)

FOREIGN PATENT DOCUMENTS

| CA | 2893290 A1 * | 6/2014 | ............. H04W 48/18 |
| CN | 103946906 A | 7/2014 | |

(Continued)

OTHER PUBLICATIONS

European Patent Office, Extended European Search Report Issued in Application No. 16908497.7, dated Mar. 10, 2020, 8 pages.

(Continued)

*Primary Examiner* — Fekadeselassie Girma
(74) *Attorney, Agent, or Firm* — McCoy Russell LLP

(57) ABSTRACT

A vehicle identification method and system are provided. The method includes: identifying a first vehicle to be a second vehicle based on a first group of data and a second group of data, the first group of data representing information of the first vehicle obtained through at least one sensor, and the second group of data representing information received from the second vehicle through an inter-vehicle communication network. By the method, an identity of the first vehicle in the inter-vehicle communication network can be known, the first group of data may be used to check the accuracy of the second group of data, and the second vehicle may be still tracked even if it is out of sight of the at least one sensor.

18 Claims, 6 Drawing Sheets

(51) Int. Cl.
G06K 9/62 (2022.01)
G08G 1/01 (2006.01)
G08G 1/04 (2006.01)

(56) References Cited

U.S. PATENT DOCUMENTS

| | | | | |
|---|---|---|---|---|
| 2013/0060443 | A1* | 3/2013 | Shida | B60K 31/0058 |
| | | | | 701/1 |
| 2013/0099941 | A1* | 4/2013 | Jana | G08G 1/0967 |
| | | | | 340/905 |
| 2014/0070980 | A1* | 3/2014 | Park | G01S 13/931 |
| | | | | 342/118 |
| 2014/0292545 | A1 | 10/2014 | Nemoto | |
| 2014/0297063 | A1* | 10/2014 | Shida | G08G 1/166 |
| | | | | 701/1 |
| 2016/0009281 | A1* | 1/2016 | Tokimasa | B60W 30/16 |
| | | | | 701/96 |
| 2016/0133128 | A1* | 5/2016 | Koo | G06V 20/63 |
| | | | | 701/117 |
| 2017/0243485 | A1* | 8/2017 | Rubin | H04W 4/12 |

FOREIGN PATENT DOCUMENTS

| | | | | |
|---|---|---|---|---|
| CN | 104200688 | A | | 12/2014 |
| CN | 105319541 | A | | 2/2016 |
| CN | 105590480 | A | | 5/2016 |
| EP | 1862988 | A1 * | 12/2007 | ............ G08G 1/163 |
| EP | 3348293 | A1 * | 7/2018 | .......... A61M 5/3204 |
| JP | 2004145479 | A * | 5/2004 | |
| JP | 4752669 | B2 | 8/2011 | |
| JP | 2012145374 | A * | 8/2012 | |
| JP | 5272844 | B2 * | 8/2013 | |
| JP | 5272844 | B2 | 8/2013 | |
| WO | WO-2013076793 | A1 * | 5/2013 | ............ G08G 1/017 |

OTHER PUBLICATIONS

ISA State Intellectual Property Office of the People's Republic of China, International Search Report and Written Opinion Issued in Application No. PCT/CN2016/090197, dated Apr. 17, 2017, WIPO, 12 pages.

European Patent Office, Office Action Issued in Application No. 16908497.7, dated Sep. 29, 2021, Netherlands, 5 pages.

* cited by examiner

VEHICLE IDENTIFICATION METHOD AND SYSTEM

CROSS REFERENCE TO RELATED APPLICATIONS

The present application is a U.S. National Phase of International Patent Application Serial No. PCT/CN2016/090197, entitled "VEHICLE IDENTIFICATION METHOD AND SYSTEM," and filed on Jul. 15, 2016. The entire contents of the above-mentioned application are hereby incorporated by reference for all purposes.

TECHNICAL FIELD

The present disclosure generally relates to vehicle identification method and system.

BACKGROUND

To assist driving, information received from neighboring vehicles through an inter-vehicle communication network or information obtained through sensors mounted on a host vehicle is used. However, position information received from a neighboring vehicle through the inter-vehicle communication network is based on a Global Positioning System (GPS) data of the neighboring vehicle, and the position information may be incorrect due to relatively low GPS accuracy. Besides, a sensor mounted on the host vehicle cannot detect information of neighboring vehicles which are sheltered by other objects and invisible to the sensor. Considering both advantages and disadvantages of information broadcast through the inter-vehicle communication network and information obtained from sensors mounted on the host vehicle, a method of incorporating the two types of information is raised.

SUMMARY

In an embodiment, a vehicle identification method is provided. The method includes: identifying a first vehicle to be a second vehicle based on a first group of data and a second group of data, the first group of data representing information of the first vehicle obtained through at least one sensor, and the second group of data representing information received from the second vehicle through an inter-vehicle communication network.

In some embodiments, the at least one sensor may include at least one selected from a combination of a Radio Detection And Ranging (radar), a Light Detection and Ranging (lidar) and a camera.

In some embodiments, the first vehicle may be identified to be the second vehicle if the first group of data is determined to match the second group of data.

In some embodiments, if information received from a plurality of neighboring vehicles which includes the second vehicle through the inter-vehicle communication network matches the first group of data, the method may further include: tracking the plurality of neighboring vehicles for a time period, till it is determined that information received from the second vehicle through the inter-vehicle communication network over the time period matches information about the first vehicle obtained through the at least one sensor over the time period.

In some embodiments, determining the first group of data to match the second group of data may include: obtaining a third group of data representing absolute information of the first vehicle based on the first group of data; and determining the second group of data to be same as or within a predetermined threshold amount of the third group of data.

In some embodiments, the third group of data may include at least one selected from a combination of heading, velocity, acceleration, braking status, size, turn signal, distance variation and yaw rate of the first vehicle.

In some embodiments, the second group of data may include at least one selected from a combination of position information, heading, velocity, acceleration, braking status, braking pressure, turn signal, yaw rate and size of the second vehicle.

In some embodiments, the method may further include: obtaining a first set of data from a plurality of detectable vehicles in sight of the at least one sensor through the at least one sensor, the first set of data including the first group of data; receiving a second set of data from a plurality of neighboring vehicles through the inter-vehicle communication network, the second set of data including the second group of data; and identifying the substantially same vehicles between the plurality of neighboring vehicles and the plurality of detectable vehicles based on the first set of data and the second set of data.

In some embodiments, the substantially same vehicles may be identified using a similarity estimation method.

In some embodiments, the method may further include: storing the identification result in a server or in a storing device.

In an embodiment, a vehicle identification system mounted on a first vehicle is provided. The system includes: a sensing device, configured to obtain a first group of data representing information of a second vehicle; a communication device, configured to receive a second group of data from a third vehicle through an inter-vehicle communication network; and a processing device, configured to identify the second vehicle to be the third vehicle based on the first group of data and the second group of data.

In some embodiments, the sensing device may include at least one sensor.

In some embodiments, the at least one sensor may include at least one selected from a combination of a radar, a lidar and a camera.

In some embodiments, the processing device may be configured to identify the second vehicle to be the third vehicle if the first group of data is determined to match the second group of data.

In some embodiments, if information received from a plurality of neighboring vehicles which includes the third vehicle through the inter-vehicle communication network matches the first group of data, the processing device may be further configured to: track the plurality of neighboring vehicles for a time period, till it is determined that information received from the third vehicle through the inter-vehicle communication network over the time period matches information about the second vehicle obtained through the sensing device over the time period.

In some embodiments, the processing device may be further configured to: obtain a third group of data representing absolute information of the second vehicle based on the first group of data; and determine the second group of data to be same as or within a predetermined threshold amount of the third group of data.

In some embodiments, the third group of data may include at least one selected from a combination of heading, velocity, acceleration, braking status, size, turn signal, distance variation and yaw rate of the second vehicle.

In some embodiments, the second group of data may include at least one selected from a combination of position information, heading, velocity, acceleration, braking status, braking pressure, turn signal, yaw rate and size of the third vehicle.

In some embodiments, the sensing device may be further configured to obtain a first set of data from a plurality of detectable vehicles in sight of the sensing device, the first set of data including the first group of data; the communication device may be further configured to receive a second set of data from a plurality of neighboring vehicles through the inter-vehicle communication network, the second set of data including the second group of data; and the processing device may be further configured to identify the substantially same vehicles between the plurality of neighboring vehicles and the plurality of detectable vehicles based on the first set of data and the second set of data.

In some embodiments, the processing device may be configured to identify the substantially same vehicles using a similarity estimation method.

In some embodiments, the processing device may be further configured to store the identification result in a server or in a storing device contained in the vehicle identification system.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

Figure 1:
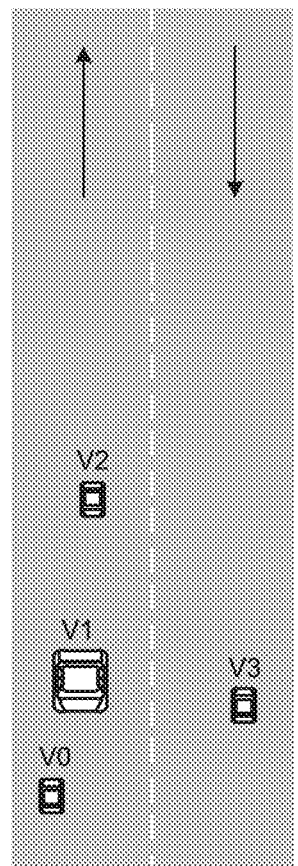
FIG. 1 is a schematic diagram illustrating actual travelling positions of a host vehicle and its neighboring vehicles according to an embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

Figure 2:
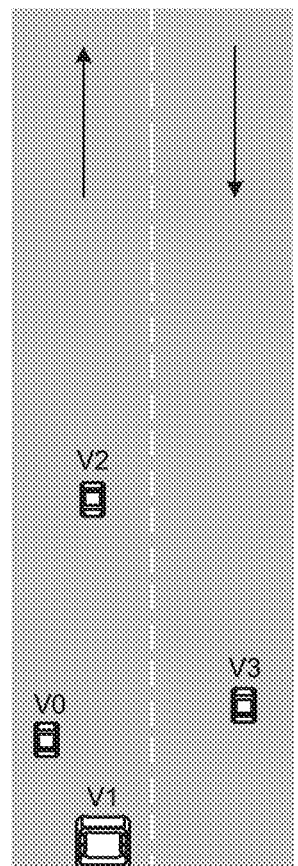
FIG. 2 is a schematic diagram illustrating a scenario where a position of the neighboring vehicles in FIG. 1 are recognized based on GPS data received from the neighboring vehicles.

FIG. 1 is a schematic diagram illustrating actual travelling positions of a host vehicle and its neighboring vehicles according to an embodiment, and FIG. 2 is a schematic diagram illustrating a scenario where a position of the neighboring vehicles in FIG. 1 are recognized based on GPS data received from the neighboring vehicles.

Referring to FIG. 1, actually, vehicles are travelling in a state illustrating in FIG. 1. Specifically, vehicles V0, V1 and V2 are travelling towards North in a first lane, a vehicle V3 is travelling towards South in a second lane adjacent to the first lane, and the vehicle V1 is located in front of the vehicle V0. However, the vehicle V0 recognizes a travelling situation as a travelling situation illustrated in FIG. 2 due to an error of GPS data contained in a message received from the vehicle V1 through the inter-vehicle communication network. Referring to FIG. 2, the vehicle V1 is recognized to be located behind the vehicle V0. As location of the vehicle V1 is incorrectly recognized, driving safety cannot be ensured. For example, if the vehicle V1 intends to brake hard, no warning is generated in the vehicle V0 as the vehicle V0 does not recognize the vehicle V1 as a front vehicle, which may influence the driving safety of the vehicle V0.

Still referring to FIG. 1, a sensor on the vehicle V0 can obtain some information about the vehicles V1 and V3 which are relatively accurate. However, the vehicle V0 cannot obtain related information of the vehicle V2 as the vehicle V2 is out of sight of the sensor due to being sheltered by the vehicle V1.

Considering the accuracy of information obtained through a sensor and a wide spread range of a message broadcasted through the inter-vehicle communication network, the information obtained through the sensor may be incorporated with the message broadcasted through the inter-vehicle communication network to enhance driving safety. Information obtained through the inter-vehicle communication network and information obtained through sensors are independent in existing techniques. Based on creative efforts, inventors found that identifying a neighboring vehicle from which a host vehicle receives a message through the network and a detectable vehicle which can be detected by a sensor mounted on the host vehicle to be a same vehicle can help the host vehicle to create mapping relations between the two types of information obtained through different ways. The mapping relations may be helpful to vehicle active safety.

Figure 3:
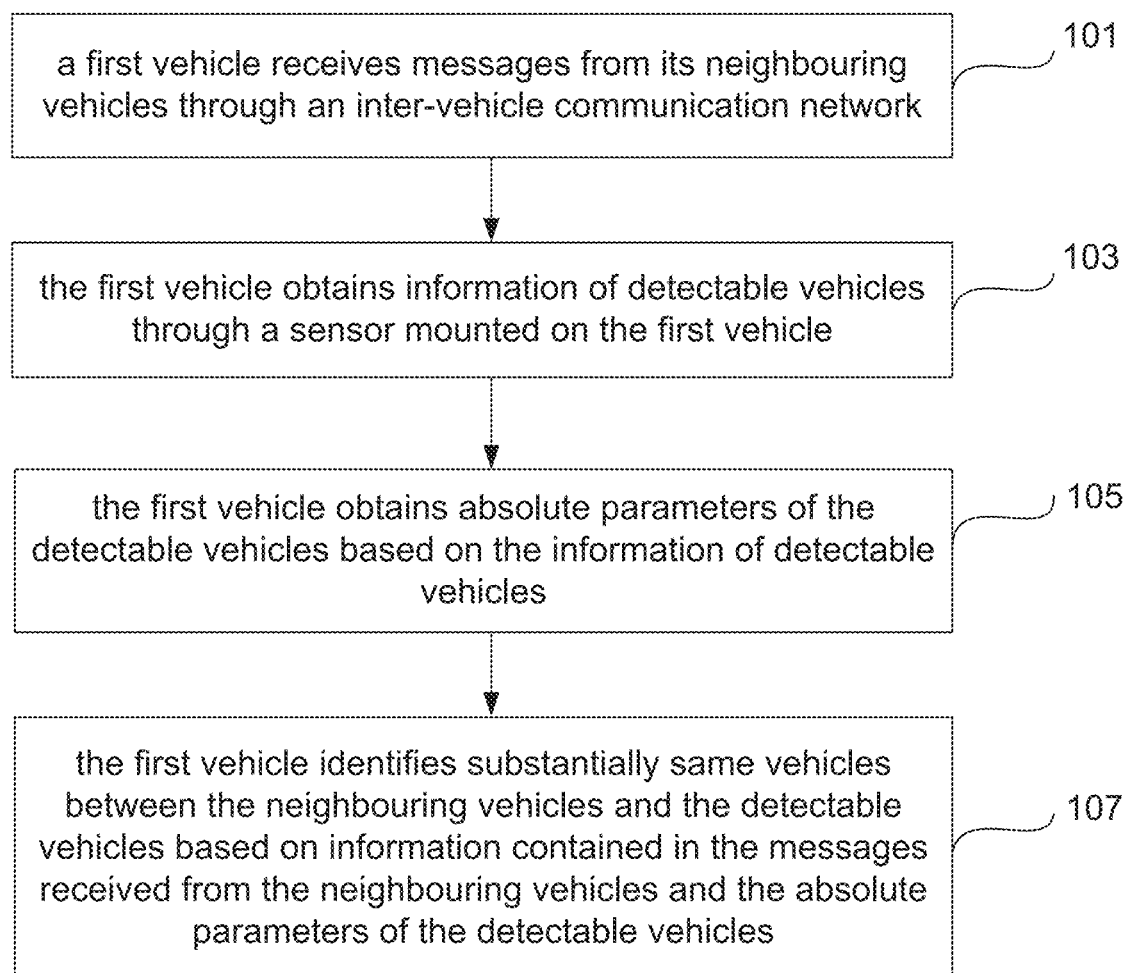
FIG. 3 is a flow chart of a vehicle identification method 100 according to an embodiment.

FIG. 3 is a flow chart of a vehicle identification method 100 according to an embodiment.

Referring to FIG. 3, in S101, a first vehicle receives messages from its neighbouring vehicles through an inter-vehicle communication network.

In some embodiments, the neighbouring vehicles represent vehicles within a communication range of the first vehicle. In some embodiments, the inter-vehicle communication network may be the Dedicated Short Range Communication (DSRC) network, i.e., the Vehicle-to-Vehicle (V2V) network.

The messages, well known as Beacon messages or Cooperative Awareness Messages (CAMs) in the art, may be broadcasted by the neighbouring vehicles periodically. It is well known in the art that vehicles exchange their Beacon messages (or called CAMs) through V2V communication systems to obtain information of neighbouring vehicles.

In some embodiments, each message from a particular neighbouring vehicle carries its state information which includes but not limited to position information, heading information, velocity, acceleration, braking status, braking pressure, turn signal, yaw rate or size of the particular neighbouring vehicle. The position information is generally obtained by GPS devices mounted on the neighbouring vehicles and may be inaccurate some times.

In some embodiments, S101 may be performed by a communication device mounted on the first vehicle, such as a wireless transceiver.

In S103, the first vehicle obtains information of detectable vehicles through a sensor mounted on the first vehicle.

In some embodiments, the detectable vehicles represent vehicles which can be detected by the sensor mounted on the first vehicle. Generally, the detectable vehicles are visible to the sensor. In some embodiments, the sensor may be a radar, a lidar or a camera. The radar or lidar is capable of obtaining relative parameters, such as distance or angles, of the detectable vehicles with respect to the first vehicle, and transmitting, through Controller Area Network (CAN) bus, the obtained relative parameters to an information collection system or a processing device amounted on the vehicle.

In some embodiments, a plurality of sensors mounted on the first vehicle may be used to detect surrounding vehicles to obtain related parameters of the detectable vehicles. For example, both a radar and a camera mounted on the first vehicle are used to detect information of the detectable vehicles.

In some embodiments, S103 may be performed periodically.

In some embodiments, the sensor may include a radar which allows to output raw data. This kind of radar provides measured resolution cell data, including received signal strength values for all spatial resolution cells, and relative angle, relative distance and relative velocity of a reflection center in every resolution cell.

In some embodiments, the sensor may include a radar which doesn't allow to output raw data. This kind of radar provides relative angle, relative distance and relative velocity of detectable vehicles with respect to the first vehicle.

In some embodiments, the sensor may include a lidar which allows to output raw data. This kind of lidar provides measured scan point data, each point being similar to a resolution cell of the raw radar data.

To the radar or lidar which allows to output raw data, relative angle, relative distance and relative velocity of the detectable vehicles with respect to the first vehicle may be calculated based on the raw data by a processing device mounted on the first vehicle.

In some embodiments, the sensor may include a camera which is capable of capturing images on which the detectable vehicles are presented.

From above, relative angle, relative distance and relative velocity of the detectable vehicles with respect to the first vehicle may be obtained through the sensor directly or indirectly.

It should be noted that, the execution order of S101 and S103 is not limited here. In some embodiments, there may be only one vehicle within the communication range of the first vehicle or visible to the sensor mounted on the first vehicle, thus, the first vehicle receives messages from the only one vehicle through the inter-vehicle communication network, or obtains information of the only one vehicle through the sensor.

Referring to FIG. 1, the host vehicle V0 obtains messages from its neighbouring vehicles V1 to V3 through the V2V network during its travel, so that the host vehicle V0 is aware of the states of the vehicles V1 to V3. This is helpful to the driving of the host vehicle V0. Besides, a sensor mounted on the host vehicle V0 detects the vehicles V1 and V3 in sight of it, to obtain relative distances, relative angles, relative velocities of the vehicles V1 and V3 with respect to the host vehicle V0, while the vehicle V2 cannot be detected by the host vehicle V0 as it is out of sight of the host vehicle V0.

In S105, the first vehicle obtains absolute parameters of the detectable vehicles based on the information of detectable vehicles.

As described in S103, information obtained through a radar or a lidar mounted on the first vehicle is relative. Besides, an image captured by a camera also needs to be processed using image processing technology. To establish mapping relations between the neighbouring vehicles and the detectable vehicles, i.e., to identify a vehicle among the neighbouring vehicles and a vehicle among the detectable vehicles to be a same vehicle, the information of detectable vehicles obtained through the sensor may be further processed.

In some embodiments, the absolute parameters of the detectable vehicles may include heading, velocity, acceleration, braking status, size, turn signal, distance variation or yaw rate of the detectable vehicles.

In some embodiments, heading of a particular detectable vehicle may be obtained based on relative position of the particular detectable vehicle with respect to the first vehicle and heading of the first vehicle. Obviously, the relative position of the particular detectable vehicle with respect to the first vehicle can be determined based on the relative distance and the relative angle of the particular detectable vehicle with respect to the first vehicle which are obtained through the radar or lidar mounted on the first vehicle.

In some embodiments, a velocity of the particular detectable vehicle may be obtained based on relative velocity of the particular detectable vehicle with respect to the first vehicle and the velocity of the first vehicle. In some embodiments, the velocity of the particular detectable vehicle may be directly obtained through the radar or lidar. For example, a radar may provide the velocity of the particular detectable vehicle using Doppler effect. The first vehicle needs to convert the velocity obtained through the radar or lidar to be in a coordinate system the same as a coordinate system where the data received through the inter-vehicle communication network is located.

In some embodiments, an acceleration of the particular detectable vehicle may be calculated based on the calculated velocity of the particular detectable vehicle.

In some embodiments, a braking status of the particular detectable vehicle may be obtained based on the calculated acceleration of the particular detectable vehicle.

In some embodiments, size of the particular detectable vehicle may be obtained based on raw data of the radar or lidar. Specifically, by counting the number of cells in measured resolution cell data output by a radar or the number of points in measured scan point data output by a lidar, the size of the particular detectable vehicle is obtained.

In some embodiments, distance variation of the particular detectable vehicle may be obtained based on raw data of the radar or lidar using a tracking algorithm.

In some embodiments, a yaw rate of the particular detectable vehicle may be obtained based on the relative angles of the particular detectable vehicle with respect to the first vehicle.

In some embodiments, a turn signal of the particular detectable vehicle may be obtained based on an image captured by a camera. Specifically, the image captured by the camera may be processed using image processing technology, to detect a blink of lights of the particular detectable vehicle presented in the image. The blink of lights of the particular detectable vehicle indicates a turn signal of the particular detectable vehicle.

In S107, the first vehicle identifies substantially same vehicles between the neighbouring vehicles and the detectable vehicles based on information contained in the messages received from the neighbouring vehicles and the absolute parameters of the detectable vehicles.

As described above, in S101, the first vehicle obtains the information of the neighbouring vehicles through the inter-vehicle communication network, including position information, heading information, velocity, acceleration, braking status, braking pressure, turn signal, yaw rate or size of the neighbouring vehicles. In S105, the first vehicle obtains the absolute parameters of the detectable vehicles, including heading, velocity, acceleration, braking status, size, turn signal, distance variation or yaw rate of the detectable vehicles.

Data received through the inter-vehicle communication network and data received through the sensor are independent. To the first vehicle, they are two separate sets of data. To find the relations between the two sets of data, the first vehicle may compare the two sets of data.

As described above, the neighbouring vehicles of the first vehicle are vehicles within a communication range of the first vehicle (for example, 1000 meters from the first vehicle), and the detectable vehicles of the first vehicle are vehicles in sight of the first vehicle which are not sheltered by other objects. Those skilled in the art can understand that, generally, the detectable vehicles are at least a portion of the neighbouring vehicles. By comparing the information contained in the messages received from the neighbouring vehicles with the absolute parameters of the detectable vehicles, the first vehicle may establish a mapping relation between the neighbouring vehicles and the detectable vehicles. That is to say, the first vehicle can identify a first particular vehicle among the detectable vehicles to be a second particular vehicle among the neighbouring vehicles. Namely, the first particular vehicle and the second particular vehicle are substantially the same one. In this way, the first vehicle can still track the first particular vehicle even if it is out of sight of the first vehicle.

In some embodiments, the first vehicle may compare the velocities and the heading of the neighbouring vehicles with the velocities of the detectable vehicles. If the velocities and the heading of the first particular vehicle are same as or similar to those of the second particular vehicle, the first vehicle may determine that the first and the second particular vehicles are substantially the same ones. In some embodiments, one value being similar to another value represents that the one value is within a predetermined threshold amount of the another value.

In some embodiments, to improve the identification accuracy, more parameters, such as acceleration, size, turn signal, braking status or yaw rate may be used in identification.

In some embodiments, distance variation is also used to identify a particular vehicle. As the messages received through the inter-vehicle communication network do not contain distance variation, the method may further include calculating distance variation using a dead reckoning method based on the position information contained in the messages.

In some embodiments, if the first particular vehicle among the detectable vehicles is determined to match more than one vehicles among the plurality of neighbouring vehicles in a plurality of parameters including, such as the velocity, the heading, the acceleration, the turn signal and the yaw rate, the first vehicle may further compare other parameters, such as size or braking status, to identify the first particular vehicle to be one of the more than one vehicles.

That is to say, the first particular vehicle may be identified to be the second particular vehicle which, among the neighbouring vehicles, has the most parameters same as or similar to those of the first particular vehicle.

In some embodiments, if the first particular vehicle among the detectable vehicles is determined to match more than one vehicles among the plurality of neighbouring vehicles in all the parameters, the method may further include: tracking the more than one vehicles for a time period till the first particular vehicle can be identified to be one of the more than one vehicles which well matches the first particular vehicle.

In some embodiments, the first vehicle can identify substantially same vehicles between the neighbouring vehicles and the detectable vehicles through many ways. For example, various methods in data fusion and data mining domains may be used. Based on information contained in the messages received from the neighbouring vehicles and the absolute parameters of the detectable vehicles, cosine similarity algorithm, Mahalanobis distance algorithm, Principal Component Analysis (PCA) algorithm or Adaptive Weight (AW) algorithm may be used to identify the substantially same vehicles between the neighboring vehicles and the detectable vehicles.

In some embodiments, S105 and S107 may be performed by a processing device mounted on the first vehicle.

After identifying the substantially same vehicles, the detectable vehicles are mapped with a portion of the neighboring vehicle, and thus the first vehicle can know identities of the detectable vehicles in the inter-vehicle communication network, and the relative position information of the detectable vehicles with respect to the first vehicle may be used to check the accuracy of the position information of the neighboring vehicles received through the inter-vehicle communication network. As the detectable vehicles are identified, even if the detectable vehicles in a first moment are out of sight of the first vehicle in a second moment, the first vehicle can still track the detectable vehicles as messages can be received from the detectable vehicles through the inter-vehicle communication network in the second moment. For example, in the first moment, based on the message received from a particular neighboring vehicle in the first moment and the message received from the particular neighboring vehicle in the second moment through the inter-vehicle communication network, the first vehicle may calculate the distance variation of the particular neighboring vehicle between the first moment and the second moment. Further, the first vehicle can obtain relative position of the particular neighboring vehicle with respect to the first vehicle in the second moment based on the calculated distance variation between the first and the second moments and the relative position of the particular neighboring vehicle with respect to the first vehicle in the first moment. Compared with GPS data contained in the message received from the particular neighboring vehicle in the second moment, the obtained relative position of the particular neighboring vehicle with respect to the first vehicle may be more accurate to enhance driving safety.

In some embodiments, the method may further include: the first vehicle storing the identification result in a server or in a storing device mounted on the first vehicle, such as a memory. Generally, the information contained in the messages received from the neighbouring vehicles through the inter-vehicle network includes a first set of identities of the neighbouring vehicles, and the information of the detectable vehicles obtained through the sensor also includes a second set of identities of the detectable vehicles. After the identification, the first vehicle may set a mapping relation between the first set of identities and the second set of identities, i.e., between identities of the matched vehicles in the first set and identities of the matched vehicles in the second set. For example, a third set may be established to carry identities of the matched vehicles in the first set, and a fourth set may be established to carry identities of the matched vehicles in the second set, where a sequence number of the identity of each matched vehicle in the third set is the same as a sequence number of the identity of the corresponding matched vehicle in the fourth set. In this way, the mapping relation between the first set of identities and the second set of identities are established to explicitly indicate which vehicles among the neighbouring vehicles and which vehicles among the detectable vehicles are substantially the same.

Hereinafter, a detailed example is described in conjunction with FIG. 4 which is a schematic diagram of an application scenario according to an embodiment.

Figure 4:
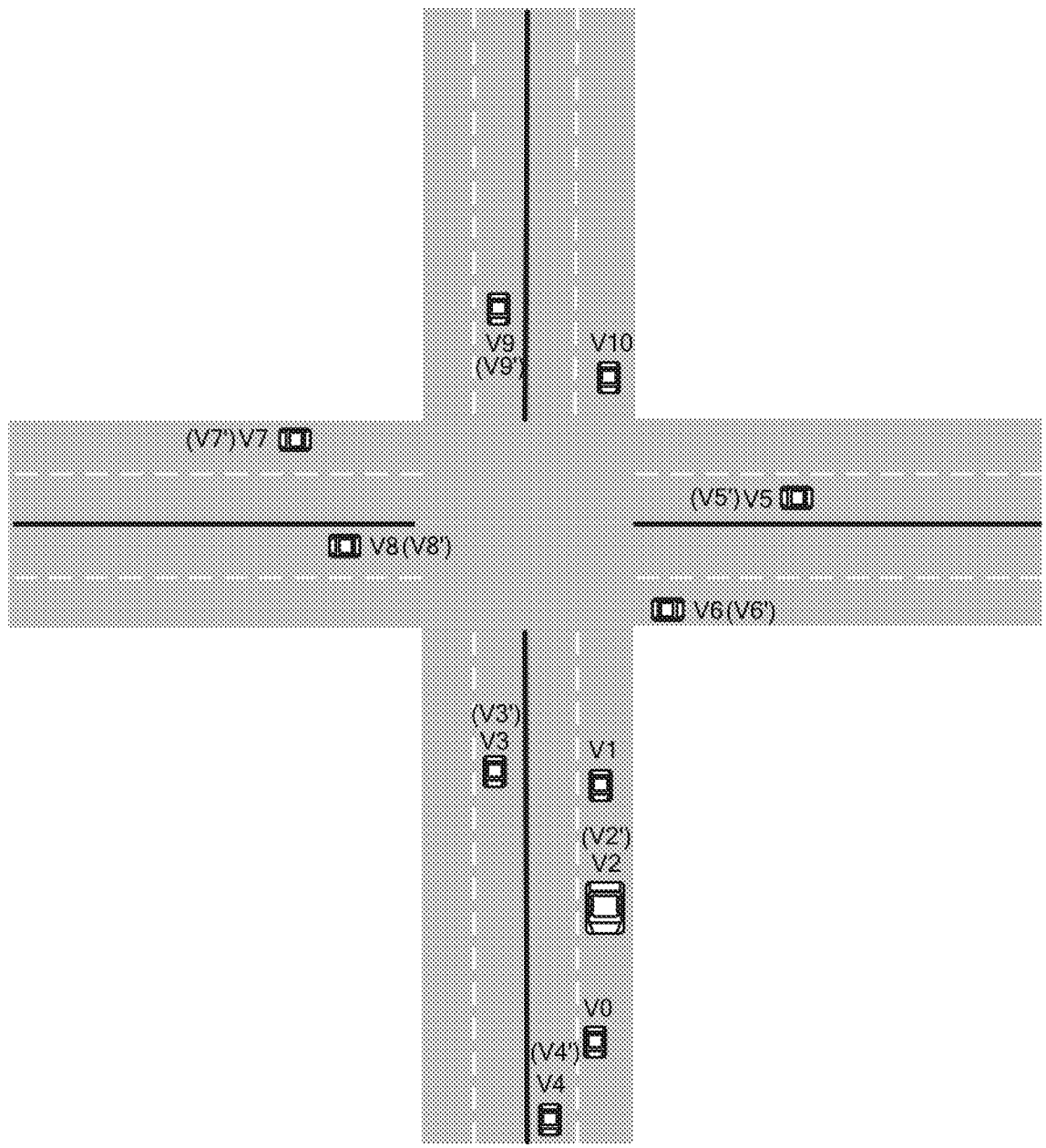
FIGS. 4 and 5 are schematic diagrams of an application scenario according to an embodiment.

Referring to FIG. 4, vehicles V0 to V10 are driving near an intersection, where the vehicles V1 to V10 are neighboring vehicles of a host vehicle V0 which are within a communication range of the host vehicle V0, that is, the host vehicle V0 can receive messages from the vehicles V1 to V10 through an inter-vehicle communication network, the messages including a first set of data. A sensor mounted on the host vehicle V0 can detect vehicles in sight of it. In FIG. 4, vehicles V1' and V10' are sheltered by a vehicle V2', thus the host vehicle V0 obtains information about vehicles V2' to V9' through the sensor. The information obtained through the sensor may include relative parameters with respect to the host vehicle V0. The host vehicle V0 processes the relative parameters to obtain corresponding absolute information of the vehicles V2' to V9' (called a second set of data). It should be noted that, the host vehicle V0 does not know correspondence between the vehicles V1 to V10 and the vehicles V2' to V9' when receiving the two sets of data, as the two sets of data are obtained through different ways. Here, references V1' to V10' are used to facilitate description but do not represent that there are really ten vehicles other than the vehicles V1 to V10 travelling on the road.

The host vehicle V0 compares the first set of data received from the vehicles V1 to V10 with the second set of data about the vehicles V2' to V9'. If one vehicle among the vehicles V1 to V10 which has parameter values same as or similar to parameter values of another vehicle among the vehicles V2' to V9', the host vehicle V0 may determine the one vehicle and the another vehicle are substantially the same one. In this way, mapping relations between the first set of data and the second set of data are determined, and the vehicles V2' to V9' are identified to be the vehicles V2 to V9. The identification may bring various advantages in vehicle active safety.

Figure 5:
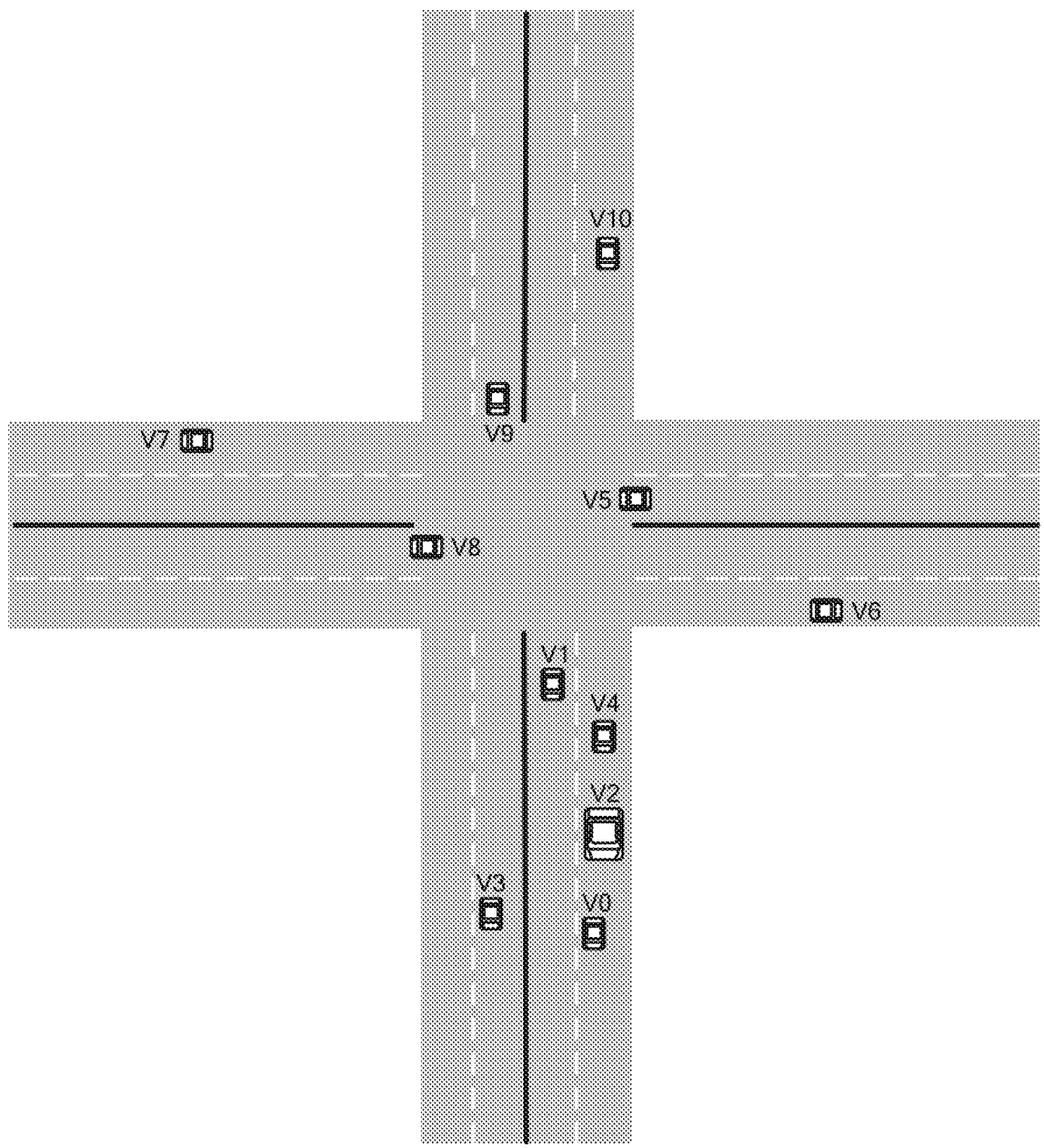

Referring to FIG. 5, after a relatively short time period, the vehicle V4' overtakes the vehicle V2', the sensor mounted on the host vehicle V0 cannot obtain information of the vehicle V4' at this moment as the vehicle V4' is out of sight of the sensor. However, as having verified that the vehicle V4' is the vehicle V4, the host vehicle V0 may use information received from the vehicle V4 through the inter-vehicle communication network at this moment. For example, based on GPS data received through the inter-vehicle communication network in FIG. 4 and FIG. 5, the host vehicle V0 can calculate a position variation of the vehicle V4. Further incorporating the calculated position variation and relative information of the vehicle V4 with respect to the host vehicle V0 obtained through the sensor in FIG. 4, the host vehicle V0 may obtain relative information of the vehicle V4 with respect to the host vehicle V0 in FIG. 5. In this way, the host vehicle V0 obtains relatively accurate position information of the sheltered vehicle V4.

Figure 6:
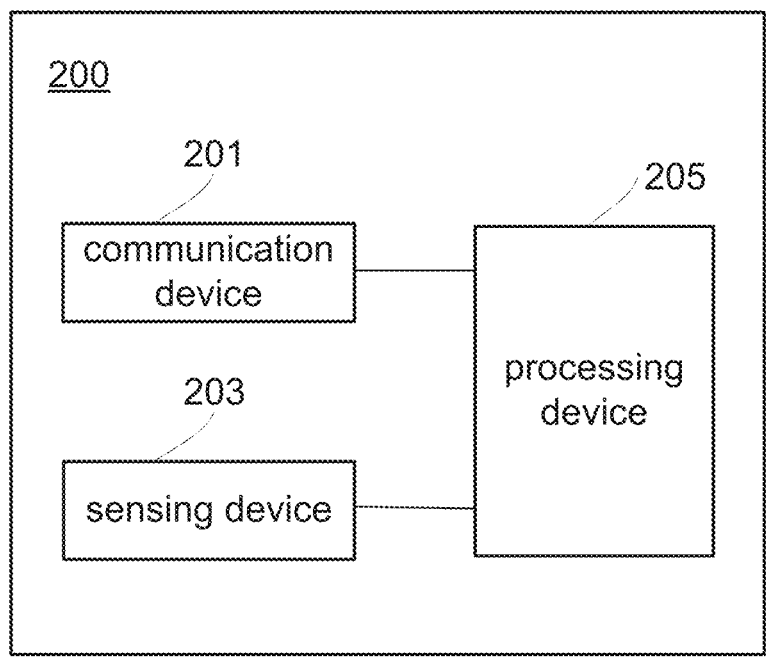
FIG. 6 is a schematic block diagram of a vehicle identification system 200 according to an embodiment.

Accordingly, in an embodiment, a vehicle identification system is provided. FIG. 6 is a schematic block diagram of a vehicle identification system 200 mounted on a first vehicle.

Referring to FIG. 6, the vehicle identification system 200 includes a communication device 201, a sensing device 203 and a processing device 205.

In some embodiments, the communication device 201 may be configured to receives messages from its neighbouring vehicles through an inter-vehicle communication network. In some embodiments, the neighbouring vehicles represent vehicles within a communication range of the first vehicle. In some embodiments, the inter-vehicle communication network may be the DSRC network, i.e., the V2V network. Vehicles exchange their Beacon messages (or called CAMs) through V2V communication systems to obtain information of neighbouring vehicles.

In some embodiments, each message from a particular neighbouring vehicle carries its state information which includes but not limited to position information, heading information, velocity, acceleration, braking status, braking pressure, turn signal, yaw rate or size of the particular neighbouring vehicle. The position information obtained by GPS devices mounted on the neighbouring vehicles is generally called GPS data and may be inaccurate some times.

In some embodiments, the communication device 201 may be a wireless transceiver mounted on the first vehicle.

In some embodiments, the sensing device 203 may include at least one sensor mounted on the first vehicle, such as a radar, a lidar or a camera. In some embodiments, the sensing device 203 may be configured to detect information of detectable vehicles. In some embodiments, the detectable vehicles represent vehicles which can be detected by the sensing device 203. Generally, the detectable vehicles are in sight of the sensing device 203. The sensing device 203 is capable of obtaining relative parameters, such as distance or angles, of the detectable vehicles with respect to the first vehicle, and transmitting, through CAN bus, the obtained relative parameters to the processing device 205.

In some embodiments, the sensing device 203 may include a radar which allows to output raw data. This kind of radar provides measured resolution cell data, including received signal strength values for all spatial resolution cells, and relative angle, relative distance and relative velocity of a reflection center in every resolution cell.

In some embodiments, the sensing device 203 may include a radar which doesn't allow to output raw data. This kind of radar provides relative angle, relative distance and relative velocity of detectable vehicles with respect to the first vehicle.

In some embodiments, the sensing device 203 may include a lidar which allows to output raw data. This kind of lidar provides measured scan point data, each point being similar to a resolution cell of the raw radar data.

No matter the sensing device 203 is a radar or a lidar, relative angle, relative distance and relative velocity of the detectable vehicles with respect to the first vehicle may be obtained through the sensing device 203 directly or indirectly.

In some embodiments, the sensing device 203 may include a camera which is capable of capturing images on which the detectable vehicles are presented.

The processing device 205 may be configured to obtain absolute parameters of the detectable vehicles based on the information of detectable vehicles obtained by the sensing device 203; and identify substantially same vehicles between the neighbouring vehicles and the detectable vehicles based on information contained in the messages received from the neighbouring vehicles and the absolute parameters of the detectable vehicles.

In some embodiments, the absolute parameters of the detectable vehicles may include heading, velocity, acceleration, braking status, size, turn signal, distance variation or yaw rate of the detectable vehicles. More detailed about obtaining these absolute parameters based on the information of detectable vehicles obtained by the sensing device 203 can be found in S105 described above.

The processing device 205 compares the information contained in the messages received from the neighbouring vehicles with the absolute parameters of the detectable vehicles, to establish a mapping relation between the neighbouring vehicles and the detectable vehicles. That is to say, the processing device 205 can identify a first particular vehicle among the detectable vehicles to be a second particular vehicle among the neighbouring vehicles. Namely, the first particular vehicle and the second particular vehicle are substantially the same one. In this way, the first vehicle can still track the first particular vehicle even if it is out of sight of the sensing device 203.

In some embodiments, the processing device 205 may compare the velocities and the heading of the neighbouring vehicles with the velocities and the heading of the detectable vehicles. If the velocities and heading of the first particular vehicle are same as or similar to those of the second particular vehicle, the first vehicle may determine that the first and the second particular vehicles are substantially the same ones. In some embodiments, one value being similar to another value represents that the one value is within a predetermined threshold amount of the another value.

In some embodiments, to improve the identification accuracy, more parameters, such as acceleration, size, turn signal, braking status or yaw rate may be used in identification.

In some embodiments, distance variation is also used to identify a particular vehicle. As the messages received through the inter-vehicle communication network do not contain distance variation, the processing device 205 may further configured to calculate distance variation using a dead reckoning method based on the position information contained in the messages.

In some embodiments, if the first particular vehicle among the detectable vehicles is determined to match more than one vehicles among the plurality of neighbouring vehicles in a plurality of parameters including, such as the velocity, the heading, the turn signal, the acceleration and the yaw rate, the processing device 205 may further configured to compare other parameters, such as size or braking status, to identify the first particular vehicle to be one of the more than one vehicles. That is to say, the first particular vehicle may be identified to be the second particular vehicle which, among the neighbouring vehicles, has the most parameters same as or similar to those of the first particular vehicle.

In some embodiments, if the first particular vehicle among the detectable vehicles is determined to match more than one vehicles among the plurality of neighbouring vehicles in all the parameters, the processing device 205 may further configured to: track the more than one vehicles for a time period till the first particular vehicle can be identified to be one of the more than one vehicles which well matches the first particular vehicle.

In some embodiments, the processing device 205 can identify substantially same vehicles between the neighbouring vehicles and the detectable vehicles through many ways. For example, various methods in data fusion and data mining domains may be used. Based on information contained in the messages received from the neighbouring vehicles and the absolute parameters of the detectable vehicles, cosine similarity algorithm, Mahalanobis distance algorithm, PCA algorithm or AW algorithm may be used to identify the substantially same vehicles between the neighboring vehicles and the detectable vehicles.

In some embodiments, the processing device 205 may be a CPU, a MCU, or a DSP etc., or any combination thereof.

In some embodiments, the vehicle identification system 200 may further include a storing device, such as a memory, to store the identification result obtained by the processing device 205.

According to one embodiment, a non-transitory computer readable medium, which contains a computer program for noise cancellation, is provided. When the computer program is executed by a processor, it will instruct the processor to: identify a first vehicle to be a second vehicle based on a first group of data and a second group of data, the first group of data representing information of the first vehicle obtained through at least one sensor, and the second group of data representing information received from the second vehicle through an inter-vehicle communication network.

There is little distinction left between hardware and software implementations of aspects of systems; the use of hardware or software is generally a design choice representing cost vs. efficiency tradeoffs. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A vehicle identification method, comprising:
 at a first moment, identifying a first vehicle to be a second vehicle based on a first group of data and a second group of data, the first group of data representing information of the first vehicle obtained through at least one sensor, and the second group of data representing information received from the second vehicle through an inter-vehicle communication network;
 storing an identification result in a server or in a storing device; and
 after a period of time from the first moment, and at a second moment when an updated first group of data cannot be obtained, calculating a position of the first vehicle based on an updated second group of data, the stored identification result, and the first group of data.

2. The method according to claim 1, wherein the at least one sensor comprises at least one selected from a combination of a radar, a lidar and a camera.

3. The method according to claim 1, wherein the first vehicle is identified to be the second vehicle if the first group of data is determined to match the second group of data.

4. The method according to claim 3, wherein if information received from a plurality of neighboring vehicles which comprises the second vehicle through the inter-vehicle communication network matches the first group of data, the method further comprises: tracking the plurality of neighboring vehicles for a time period, till it is determined that information received from the second vehicle through the inter-vehicle communication network over the time period matches information about the first vehicle obtained through the at least one sensor over the time period.

5. The method according to claim 3, wherein determining the first group of data to match the second group of data comprises: obtaining a third group of data representing absolute information of the first vehicle based on the first group of data; and determining the second group of data to be same as or within a predetermined threshold amount of the third group of data.

6. The method according to claim 5, wherein the third group of data comprises at least one selected from a combination of heading, velocity, acceleration, braking status, size, turn signal, distance variation and yaw rate of the first vehicle.

7. The method according to claim 1, wherein the second group of data comprises at least one selected from a combination of position information, heading, velocity, acceleration, braking status, braking pressure, turn signal, yaw rate and size of the second vehicle.

8. The method according to claim 1, further comprising:
obtaining a first set of data from a plurality of detectable vehicles in sight of the at least one sensor through the at least one sensor, the first set of data comprising the first group of data;
receiving a second set of data from a plurality of neighboring vehicles through the inter-vehicle communication network, the second set of data comprising the second group of data; and
identifying the substantially same vehicles between the plurality of neighboring vehicles and the plurality of detectable vehicles based on the first set of data and the second set of data.

9. The method according to claim 8, wherein the substantially same vehicles are identified using a similarity estimation method.

10. A vehicle identification system mounted on a first vehicle, comprising:
a sensing device, configured to obtain a first group of data representing information of a second vehicle;
a communication device, configured to receive a second group of data from a third vehicle through an inter-vehicle communication network; and
a processing device, configured to identify the second vehicle to be the third vehicle based on the first group of data obtained at a first moment and the second group of data obtained at the first moment,
wherein the processing device is further configured to:
store the identification result in a server or in a storing device contained in the vehicle identification system, and
after a period of time from the first moment, and at a second moment when the first group of data cannot be obtained, calculate a position of the first vehicle based on the second group of data obtained at the second moment, the stored identification result, and the first group of data obtained at the first moment.

11. The vehicle identification system according to claim 10, wherein the sensing device comprises at least one sensor, the at least one sensor comprising at least one selected from a combination of a radar, a lidar and a camera.

12. The vehicle identification system according to claim 10, wherein the processing device is configured to identify the second vehicle to be the third vehicle if the first group of data obtained at the first moment is determined to match the second group of data obtained at the first moment.

13. The vehicle identification system according to claim 12, wherein if information received from a plurality of neighboring vehicles which comprises the third vehicle through the inter-vehicle communication network matches the first group of data obtained at the first moment, the processing device is further configured to: track the plurality of neighboring vehicles for a time period, till it is determined that information received from the third vehicle through the inter-vehicle communication network over the time period matches information about the second vehicle obtained through the sensing device over the time period.

14. The vehicle identification system according to claim 12, wherein the processing device is further configured to: at the first moment, obtain a third group of data representing absolute information of the second vehicle based on the first group of data; and determine the second group of data to be same as or within a predetermined threshold amount of the third group of data.

15. The vehicle identification system according to claim 14, wherein the third group of data comprises at least one selected from a combination of heading, velocity, acceleration, braking status, size, turn signal, distance variation and yaw rate of the second vehicle.

16. The vehicle identification system according to claim 10, wherein the second group of data comprises at least one selected from a combination of position information, heading, velocity, acceleration, braking status, braking pressure, turn signal, yaw rate and size of the third vehicle.

17. The vehicle identification system according to claim 10, wherein the sensing device is further configured to obtain a first set of data at the first moment from a plurality of detectable vehicles in sight of the sensing device, the first set of data comprising the first group of data;
the communication device is further configured to receive a second set of data at the first moment from a plurality of neighboring vehicles through the inter-vehicle communication network, the second set of data comprising the second group of data; and
the processing device is further configured to identify the substantially same vehicles between the plurality of neighboring vehicles and the plurality of detectable vehicles based on the first set of data and the second set of data.

18. The vehicle identification system according to claim 17, wherein the processing device is configured to identify the substantially same vehicles using a similarity estimation method.

* * * * *